(12) United States Patent
Panasiewicz et al.

(10) Patent No.: US 11,110,875 B2
(45) Date of Patent: Sep. 7, 2021

(54) VEHICLE FRAME TIE BAR

(71) Applicant: A.G. SIMPSON (USA), INC, Sterling Heights, MI (US)

(72) Inventors: Jeremy A. Panasiewicz, Macomb, MI (US); Uwe Sehling, Armada, MI (US); Rory B. Patterson, Berkley, MI (US); Matthew O'Lear, Warren, MI (US)

(73) Assignee: A.G. Simpson (USA), Inc, Sterling Heights, MI (US)

( * ) Notice: Subject to any disclaimer, the term of this patent is extended or adjusted under 35 U.S.C. 154(b) by 385 days.

(21) Appl. No.: 15/999,101

(22) PCT Filed: Feb. 21, 2017

(86) PCT No.: PCT/IB2017/000210
§ 371 (c)(1),
(2) Date: Aug. 17, 2018

(87) PCT Pub. No.: WO2017/141112
PCT Pub. Date: Aug. 24, 2017

(65) Prior Publication Data
US 2021/0031712 A1 Feb. 4, 2021

Related U.S. Application Data

(60) Provisional application No. 62/297,165, filed on Feb. 19, 2016.

(51) Int. Cl.
*B60R 19/34* (2006.01)
*B62D 21/15* (2006.01)
(Continued)

(52) U.S. Cl.
CPC ............ *B60R 19/34* (2013.01); *B62D 21/152* (2013.01); *B62D 29/004* (2013.01); *F16F 7/003* (2013.01); *F16F 7/12* (2013.01); *F16F 7/121* (2013.01)

(58) Field of Classification Search
CPC ....... B60R 19/023; B60R 19/04; B60R 19/12; B60R 19/18; B60R 19/26; B60R 19/30;
(Continued)

(56) References Cited

U.S. PATENT DOCUMENTS 4,999,227 A * 3/1991 Vander Togt ....... B29C 44/1276
428/31
6,270,131 B1 * 8/2001 Martinez ................. B60R 19/34
188/371
(Continued)

FOREIGN PATENT DOCUMENTS

EP 2487090 8/2012

*Primary Examiner* — Gregory A Blankenship
(74) *Attorney, Agent, or Firm* — Miller Canfield

(57) ABSTRACT

A composite tie bar assembly for distributing loads to a support frame of an automotive vehicle. The tie bar assembly includes a pair of spaced apart. reinforcement bars extending longitudinally between opposing ends. A tie bar shell is supported by the reinforcement bars and extends between opposite first and second distal cods. The tie bar shell has a first support plate extending between the reinforcement bars adjacent the first distal end and a second support plate extending between the reinforcement bars adjacent the second distal end. Bach of the support plates includes a plurality of structural ribs formed Integral therewith for distributing loads from the reinforcement bars to the support frame of the vehicle.

12 Claims, 9 Drawing Sheets

(51) Int. Cl.
*B62D 29/00* (2006.01)
*F16F 7/00* (2006.01)
*F16F 7/12* (2006.01)

(58) Field of Classification Search
CPC . B60R 19/36; B60R 19/34; B60R 2019/1813; B60R 2019/1833; B60R 2019/1846; B60R 2019/1853; B60R 2019/186; B60R 2019/1866; B62D 21/152; F16F 7/003; F16F 7/12; F16F 7/121
USPC .................................................. 293/132, 133
See application file for complete search history.

(56) References Cited

U.S. PATENT DOCUMENTS

| | | | | |
|---|---|---|---|---|
| 6,312,028 | B1* | 11/2001 | Wilkosz | B60R 19/18 188/377 |
| 6,371,540 | B1* | 4/2002 | Campanella | B60R 19/18 293/102 |
| 6,435,579 | B1* | 8/2002 | Glance | B60R 19/18 293/102 |
| 8,764,104 | B2 | 7/2014 | Kihara et al. | |
| 8,905,415 | B2 | 12/2014 | Takeshita et al. | |
| 9,067,550 | B2* | 6/2015 | Nagwanshi | B60R 19/22 |
| 9,187,053 | B2 | 11/2015 | Nusier et al. | |
| 9,199,592 | B1 | 12/2015 | Nusier et al. | |
| 2003/0227184 | A1* | 12/2003 | Evans | B60D 1/56 293/120 |
| 2004/0217606 | A1* | 11/2004 | Weykamp | B60R 19/26 293/133 |
| 2004/0262931 | A1* | 12/2004 | Roussel | B60R 19/18 293/120 |
| 2005/0116498 | A1* | 6/2005 | Kobayashi | B60R 19/24 296/155 |
| 2006/0061111 | A1* | 3/2006 | Ignafol | B60R 19/18 293/102 |
| 2006/0214439 | A1* | 9/2006 | Reynolds | B60R 19/18 293/132 |
| 2007/0257497 | A1* | 11/2007 | Heatherington | B60R 19/18 293/120 |
| 2007/0271793 | A1* | 11/2007 | Mellis | B22D 19/04 29/897.2 |
| 2008/0277950 | A1* | 11/2008 | Nees | B60R 19/48 293/106 |
| 2011/0254295 | A1* | 10/2011 | Cave | B29C 66/7212 293/132 |
| 2012/0104775 | A1* | 5/2012 | Marur | F16F 7/003 293/120 |
| 2013/0147217 | A1* | 6/2013 | Kim | B60R 19/12 293/148 |
| 2013/0147233 | A1* | 6/2013 | Miyashita | B60R 19/34 296/187.1 |
| 2013/0154285 | A1* | 6/2013 | Jeong | B60R 19/34 293/133 |
| 2013/0175813 | A1* | 7/2013 | Mana | B60R 19/18 293/120 |
| 2015/0115572 | A1* | 4/2015 | Kim | B60D 1/56 280/500 |
| 2015/0175109 | A1* | 6/2015 | Mori | B62D 21/152 293/133 |
| 2016/0001722 | A1* | 1/2016 | Nickel | B60R 19/483 293/120 |
| 2016/0144815 | A1* | 5/2016 | Harris | B60R 19/18 293/142 |
| 2016/0264081 | A1* | 9/2016 | Kibben | B60R 19/12 |
| 2016/0280167 | A1* | 9/2016 | Kaneko | B60R 19/34 |
| 2016/0332587 | A1* | 11/2016 | Ginja | B60R 19/18 |
| 2017/0028951 | A1* | 2/2017 | Shin | B60R 19/03 |
| 2017/0113734 | A1* | 4/2017 | Kato | B62D 25/08 |
| 2018/0037179 | A1* | 2/2018 | Steinebach | B22D 25/02 |
| 2018/0141512 | A1* | 5/2018 | Munjurulimana | B60R 19/18 |
| 2018/0290611 | A1* | 10/2018 | Munjurulimana | B60R 19/34 |
| 2019/0152414 | A1* | 5/2019 | Glickman | B60R 19/34 |
| 2020/0353986 | A1* | 11/2020 | Kim | B62D 25/085 |
| 2020/0384934 | A1* | 12/2020 | Yotsuyanagi | B60R 19/34 |
| 2020/0398895 | A1* | 12/2020 | Gunther | B62D 21/15 |

* cited by examiner

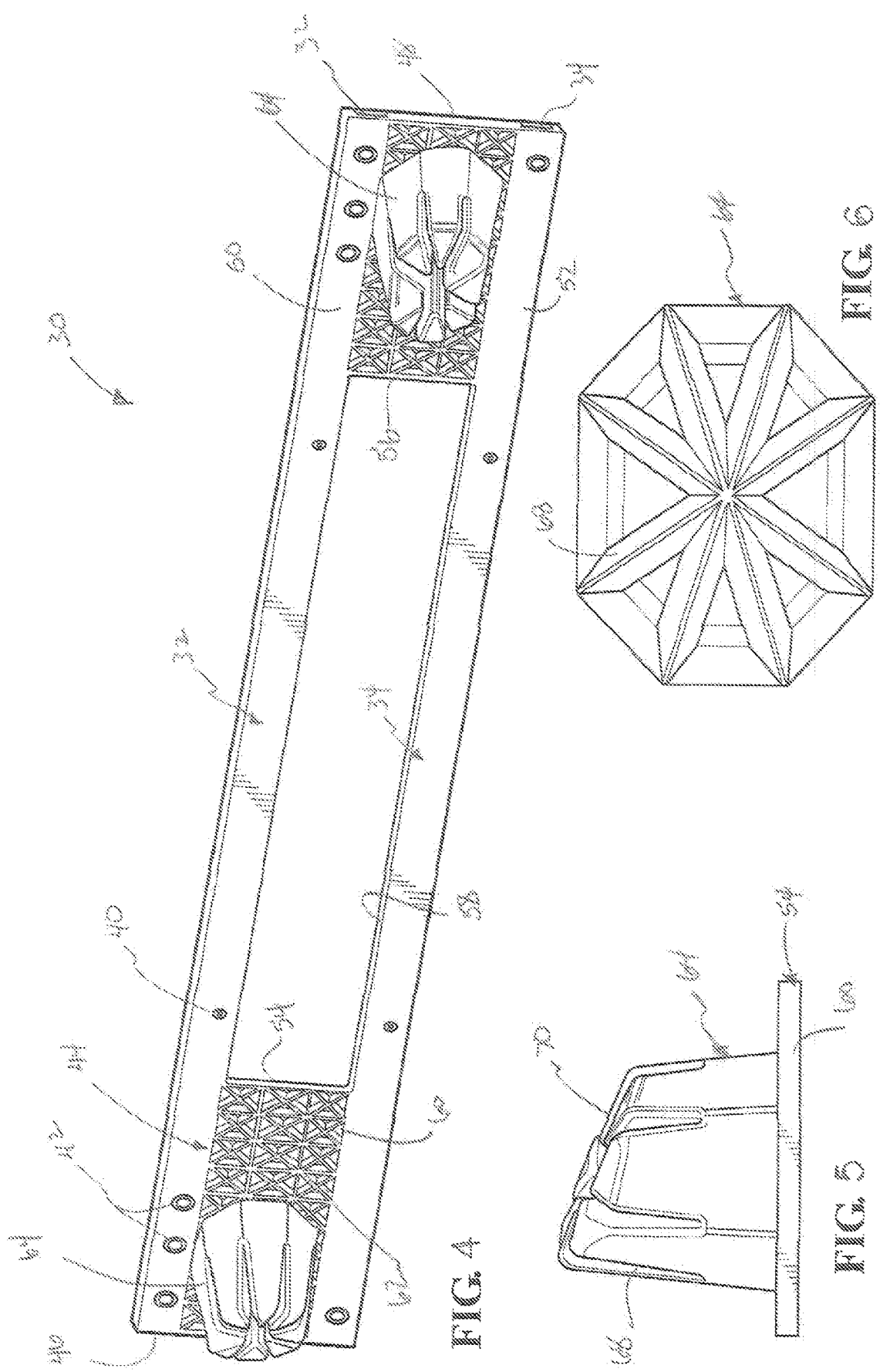

VEHICLE FRAME TIE BAR

CROSS-REFERENCE TO RELATED APPLICATIONS

This application claims priority to U.S. Provisional Application No. 62/297,165, filed on Feb. 19, 2016.

BACKGROUND OF THE INVENTION

1. Field of the Invention

The present invention relates to a vehicle frame tie bar assembly. More particularly, the invention relates to a molded composite shell supported by lateral reinforcement bars to distribute the load and energy absorption to and between spaced apart side rails of a support frame of an automotive vehicle.

2. Description of Related Art

Automotive vehicles include a rigid metal support frame for supporting the vehicle body, engine and powertrain. The support frame commonly comprises spaced apart and opposing longitudinally extending side rails and a bumper assembly disposed and attached to the front distal end of each side rail. The front portion of the side rails adjacent the bumper assembly is typically referred to as the front rail. The front rails are designed to absorb energy from the bumper in vehicle front impacts. It is desirable to evenly distribute the load and energy absorption to and between each of the side rails. As such, a tie bar is connected between the front rails between the bumper and the front distal ends of the side rails to distribute the load in a vehicle front impact. The tie bar is typically comprised of a stamped metal plate extending between the opposing front rails. A stamped metal mounting bracket connects the ends of the tie bar to the ends of the front rails and also facilitates mounting of the bumper to the tie bar.

However, the current tie bar is comprised of multiple stamped metal components adding weight, complexity and cost to the tie bar.

It is desirable, therefore, to reduce the weight and parts of the tie bar assembly while reducing cost, distributing load to the front rails and absorbing energy in a vehicle front impact.

SUMMARY OF THE INVENTION

A tie bar assembly is provided for distributing loads to a support frame of an automotive vehicle. The tie bar assembly comprises a pair of spaced apart reinforcement bars extending longitudinally between opposing ends. A tie bar shell is supported by the reinforcement bars and extends between opposite first and second distal ends. The tie bar shell has a first support plate extending between the reinforcement bars adjacent the first distal end and a second support plate extending between the reinforcement bars adjacent the second distal end. Each of the support plates includes a plurality of structural ribs formed integral therewith for distributing loads from the reinforcement bars to the support frame of the vehicle.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a perspective view of the tie bar assembly of FIG. 3;

FIG. 5 is a side view of a crush can of the tie bar assembly;

FIG. 6 is a top view of the crush can;

DETAILED DESCRIPTION OF THE EMBODIMENTS

Figure 1:
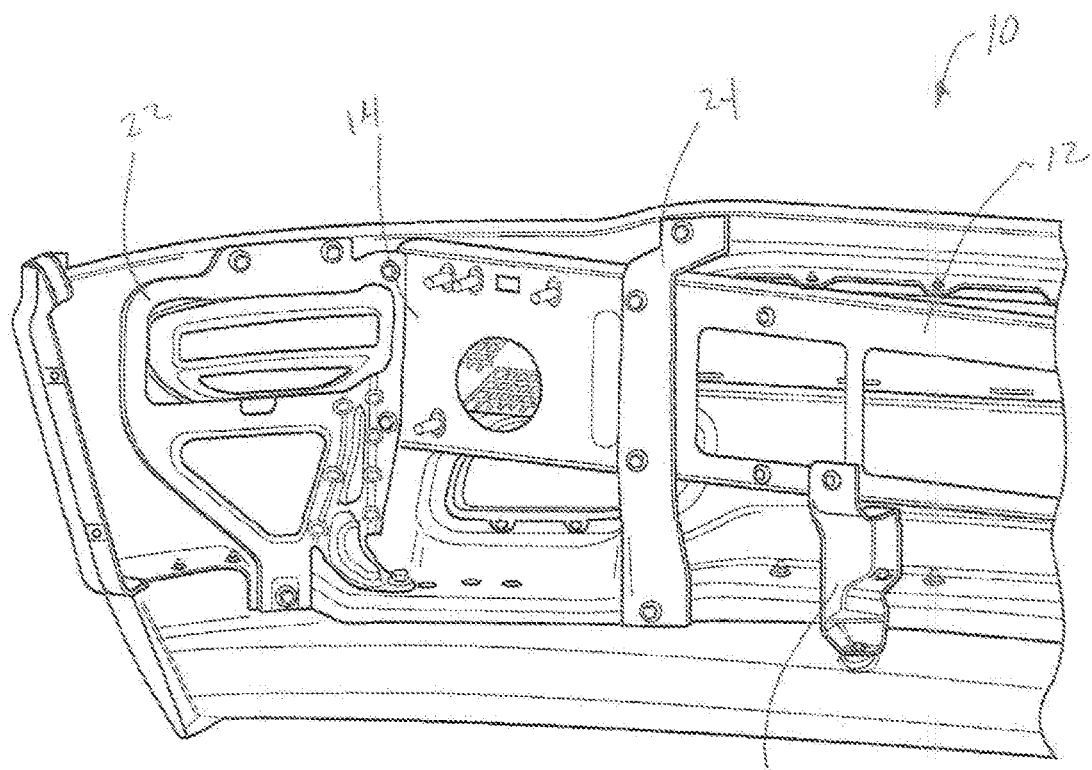
FIG. 1 is a fragmentary plan view of a tie bar assembly according to the prior art.
Figure 2:
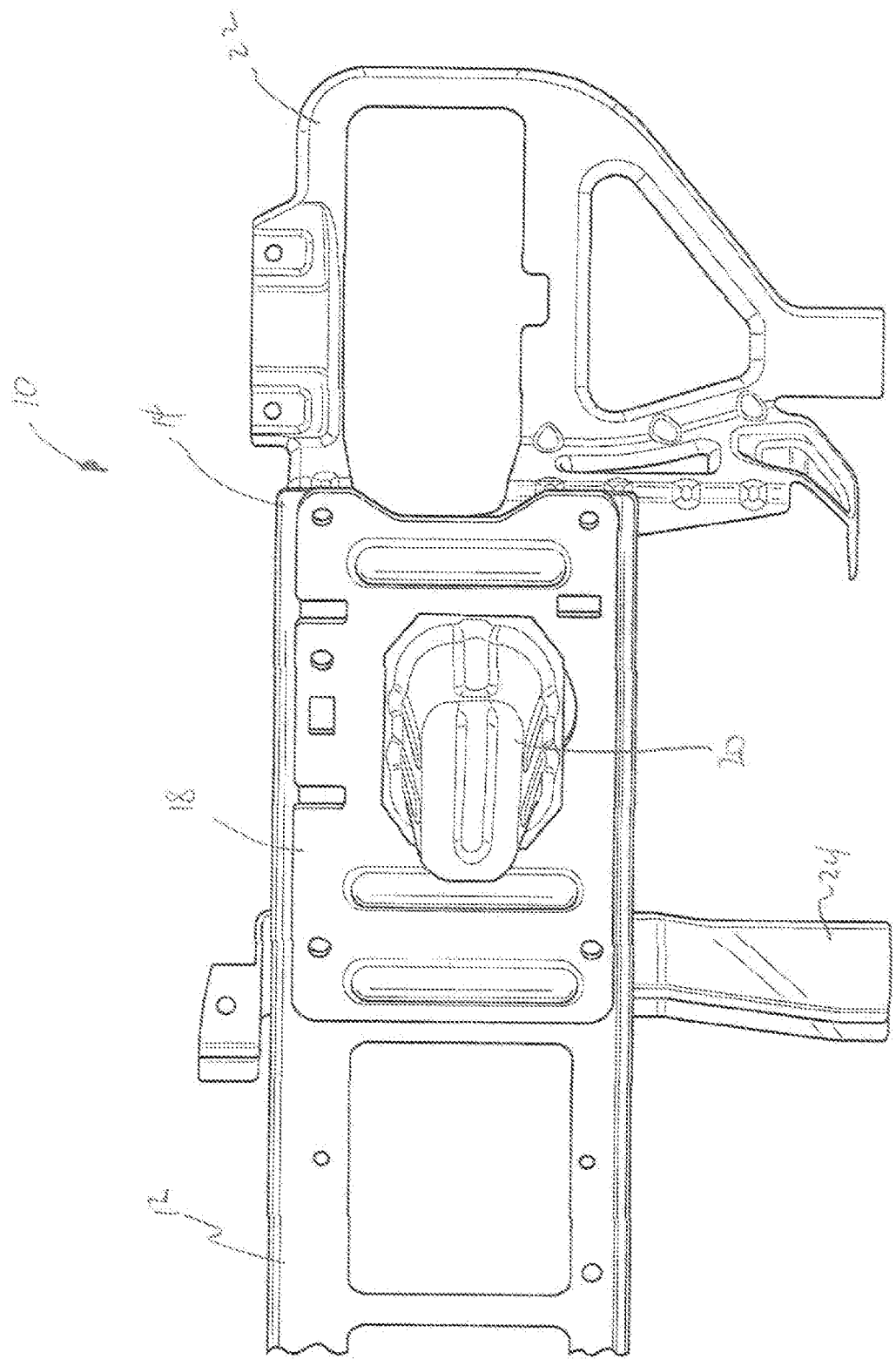
FIG. 2 is an enlarged fragmentary perspective view of the prior art tie bar assembly.
Figure 7:
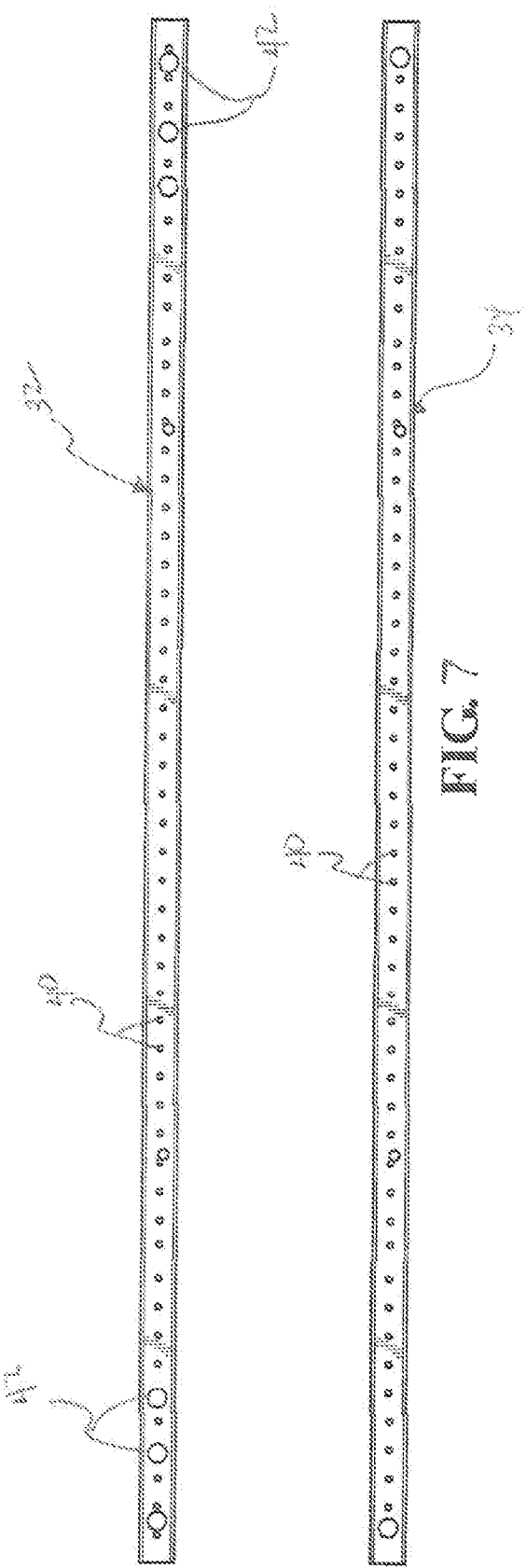
FIG. 7 is a plan view of the reinforcement bars of the tie bar assembly of FIG. 3.
Figure 8:
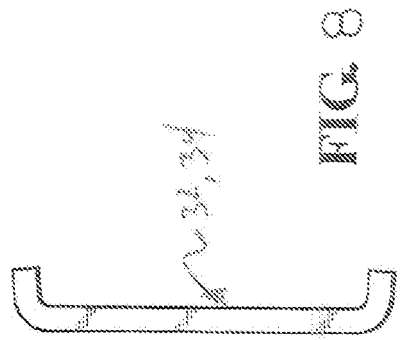
FIG. 8 is an end view of one of the reinforcement bars of FIG. 7.

Referring to FIGS. 1 and 2, a tie bar assembly for an automotive vehicle according to a prior art embodiment is shown at 10. The prior art tie bar assembly 10 includes a generally rectangular stamped, elongated metal tie bar frame 12 extending between opposite lateral ends 14. A stamped metal double plate 18 is fixedly mounted to an end portion of the tie bar frame 12 adjacent each lateral end 14 for increase load and energy absorption distribution. A stamped metal crush can 20 is fixedly mounted to each double plate 18 for absorbing energy in a vehicle front impact. A fog lamp bracket 22 is fixedly fastened to each lateral end 14 of the tie bar frame 12 for mounting vehicle fog lamps. Finally, a plurality of mounting brackets 24, 26 are fastened to the tie bar frame 12 for fixedly securing the tie bar assembly 10 to front rails of the vehicle support frame side rails as is commonly known in the art. Additionally, a front bumper and cladding may further be fastened to the front face of the tie bar assembly 10 with the tie bar frame 12 seated between the front bumper and the vehicle front rails.

Referring to FIGS. 3-9, the present invention according to one embodiment of the invention is shown comprising a plastic or composite tie bar assembly 30 for an automotive vehicle. The tie bar assembly 30 includes a pair of elongated lateral reinforcement bars 32, 34 extending between opposite first and second ends 36, 38. The bars 32, 34 have a generally U-shaped cross-sectional shape and include a plurality of longitudinally spaced apart overflow holes 40 and compression insert holes 42 extending therethrough. The bars 32, 34 may be comprised of stamped metal, molded plastic, composite material, fiber or other generally rigid material.

The tie bar assembly 30 further includes a tie bar shell 44 supported by the pair of reinforcement bars 32, 34. The tie bar shell 44 extends longitudinally between opposite first and second distal ends 46, 48 and includes an upper frame rail 50 spaced vertically above a lower frame rail 52 wherein each extend laterally between the distal ends 46, 48. The tie bar shell 44 further includes a first support plate 54 extending between the upper frame rail 50 and lower frame rail 52 adjacent the first distal end 46 and a second support plate 56 extending between the upper frame rail 50 and lower frame rail 52 adjacent the second distal end 48 defining a generally rectangular opening 58 therebetween. Each of the support plates 54, 56 includes a planar base portion 60 and a plurality of integral reinforcement structural ribs 62 projecting from the base portion 60 and formed in a grid-type pattern as shown to increase the strength and stiffness of the shell 44. Further, the tie bar shell 44 includes a generally cylindrical shaped crush can 64 projecting outwardly from the base portion 60 of each support plate 54, 56 for absorbing energy in a vehicle front impact as will be further described hereinbelow. The crush can 64 shown in the figures forms a generally hollow cavity 66 having a plurality of creases 68 formed therein and a tapered or sloped distal end 70.

In the preferred embodiment, the tie bar shell 44 is overmolded to the reinforcement bars 32, 34 such that the reinforcement bars 32, 34 extend longitudinally along the respective upper and lower frame rails 50, 52 between the distal ends 46, 48. The material of the shell 44 over flows into the overflow holes 40 to provide a secure connecting therebetween. The insert holes 42 provide for attachment of the tie bar assembly 30 to the front rails of the vehicle support rails.

Figure 3:
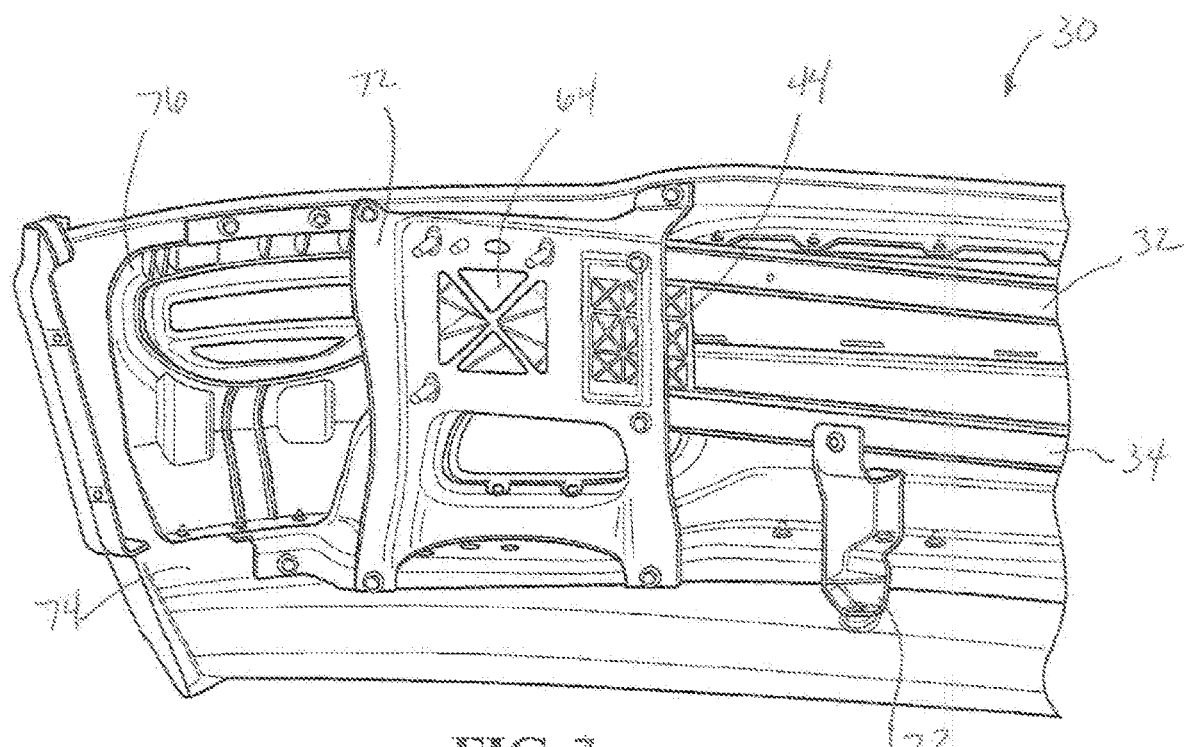
FIG. 3 is a fragmentary plan view of a tie bar assembly according to a first embodiment of the present invention.
Figure 9:
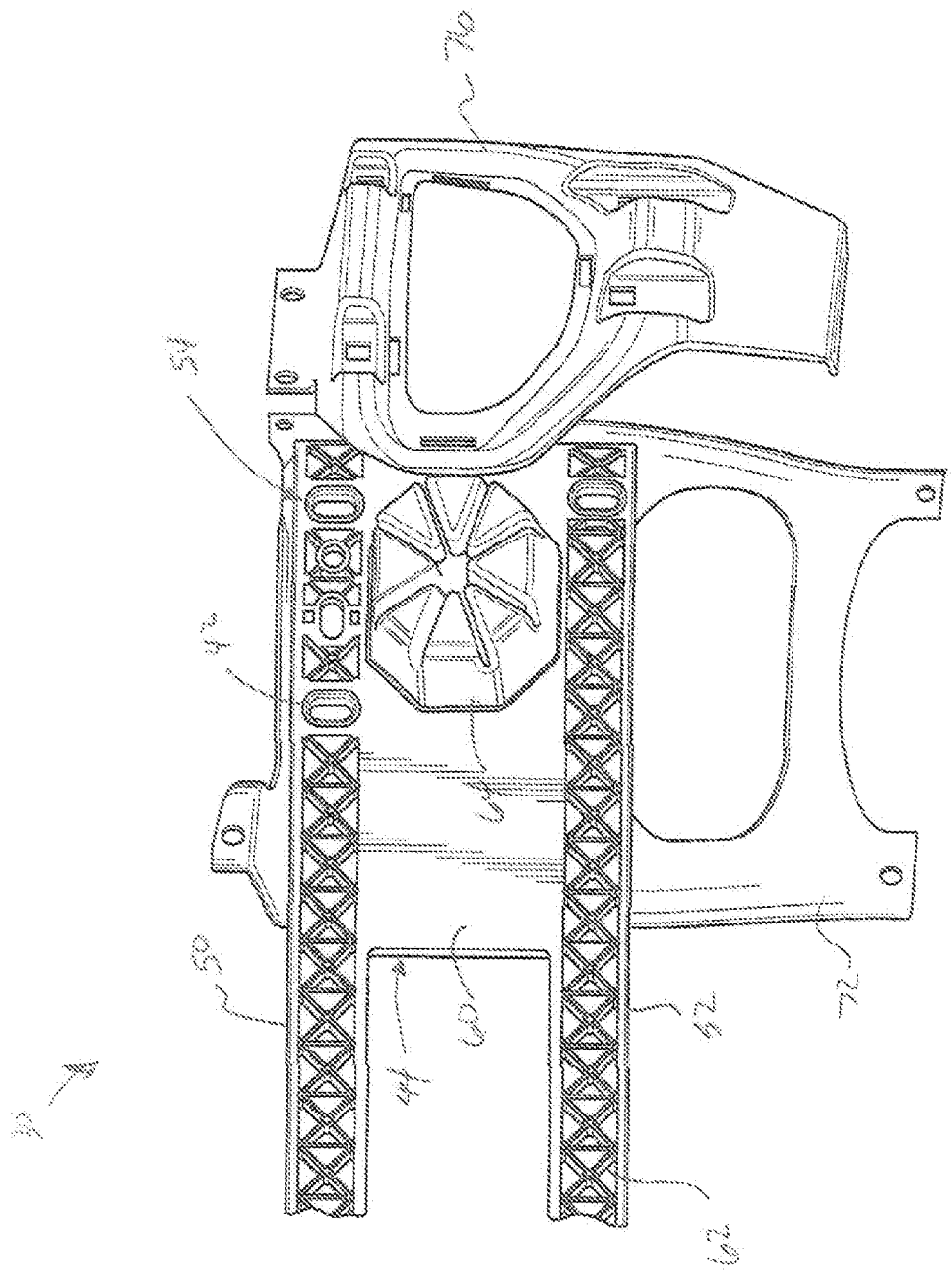
FIG. 9 is a plan view of the tie bar assembly of FIG. 3 with mounting brackets.

Referring to FIGS. 3 and 9, the tie bar assembly 30 is shown with a shell mounting bracket 72 for fixedly securing the tie bar assembly 30 between the vehicle front rails and between the vehicle bumper or cladding 74 and the front rails. The mounting brackets 72 are stamped metal brackets and further support a plastic molded fog lamp bracket 76 if desired. As such, the reinforcement bars 32, 34 accommodate the loads between the front rails and the tie bar shell 44 reduces the overall weight of the assembly 30.

Figure 10:
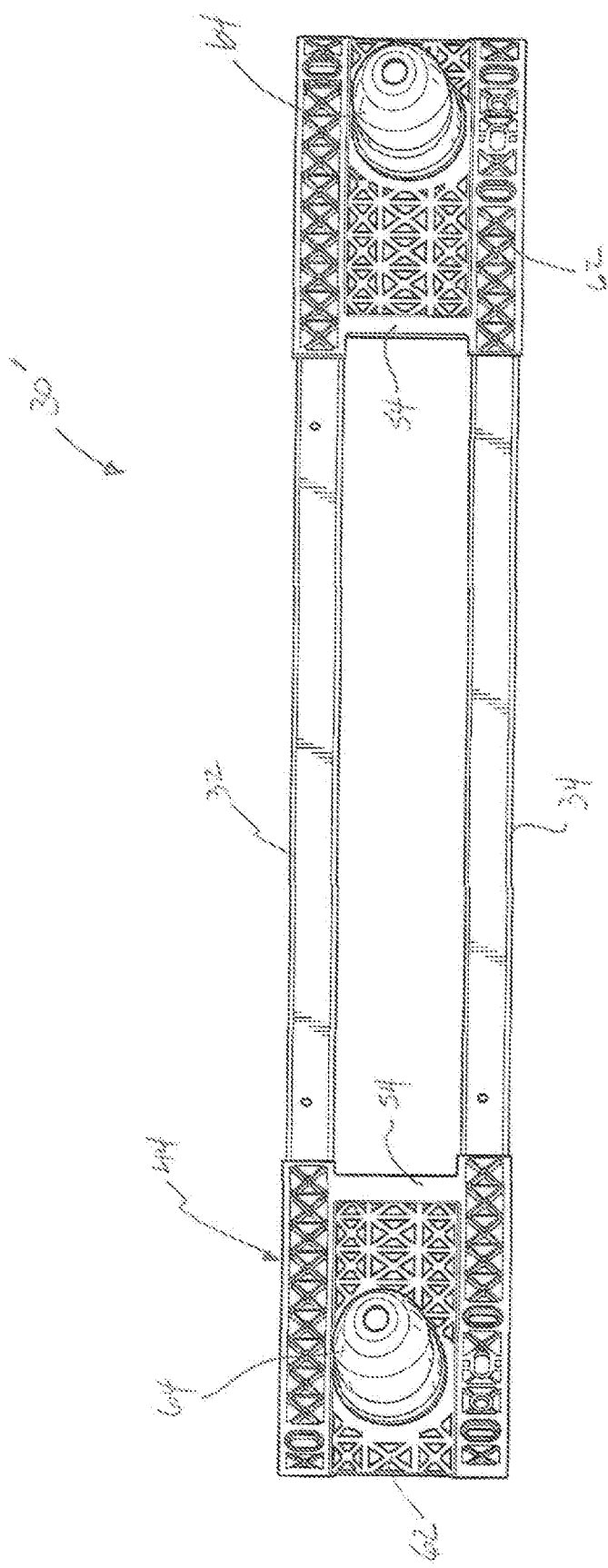
FIG. 10 is a plan view of a tie bar assembly according to alternative embodiment of the invention.
Figure 11:
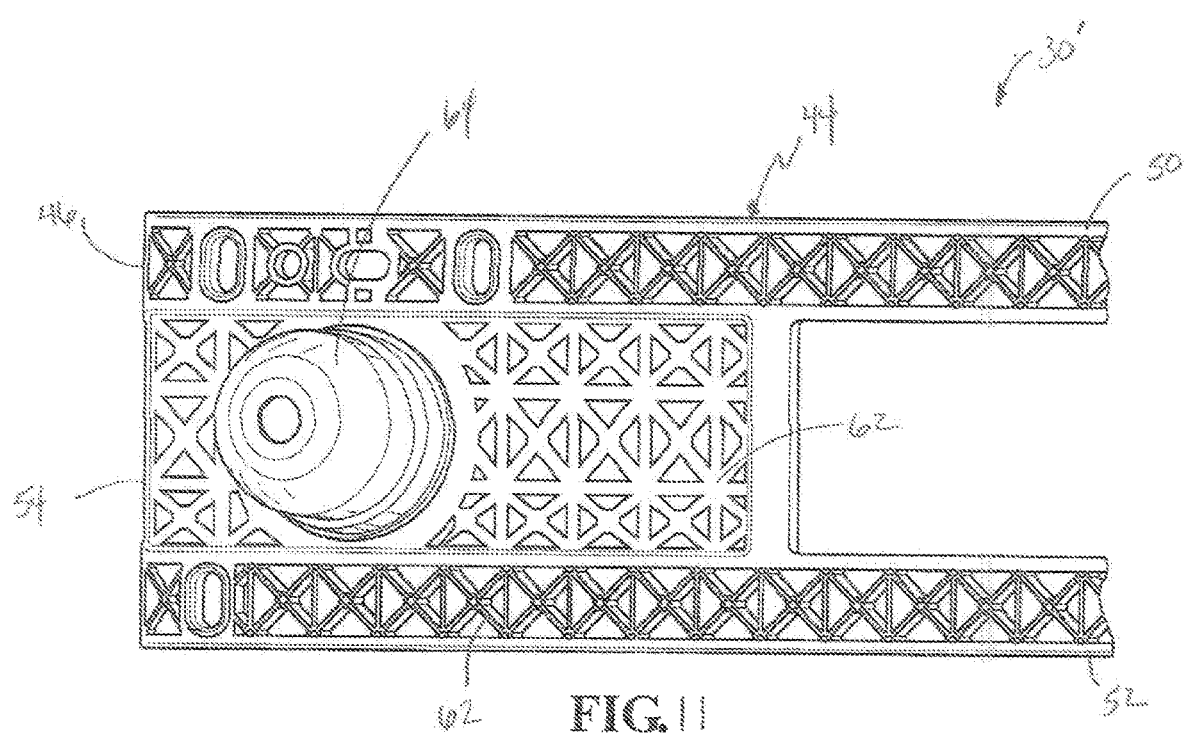
FIG. 11 is an enlarged front plan view of the tie bar assembly of FIG. 10.
Figure 12:
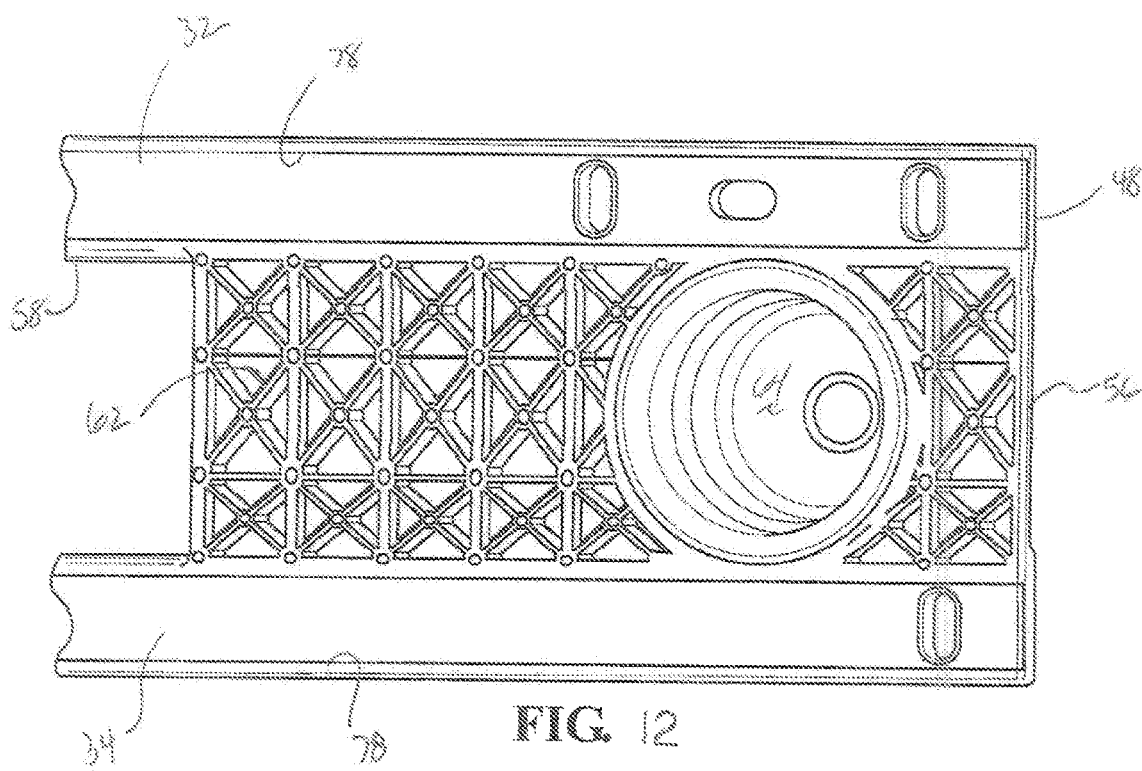
FIG. 12 is an enlarged rear plan view of the tie bar assembly of FIG. 10.

Referring to FIGS. 10-12, an alternative embodiment of the tie bar assembly is shown at 30' wherein additional weight is reduced by eliminating the upper frame rail 50 and lower frame rail 52 portions of the shell 44'. Additionally, the first and second support plates 54', 56' may be formed entirely of interconnected structural ribs 62' to reduce the amount of shell material and thus weight. As shown in the alternative tie bar assembly 30', the reinforcement bars 32', 34' are received and overmolded into channels 78 formed in the support plates 54', 56'.

Figure 13:
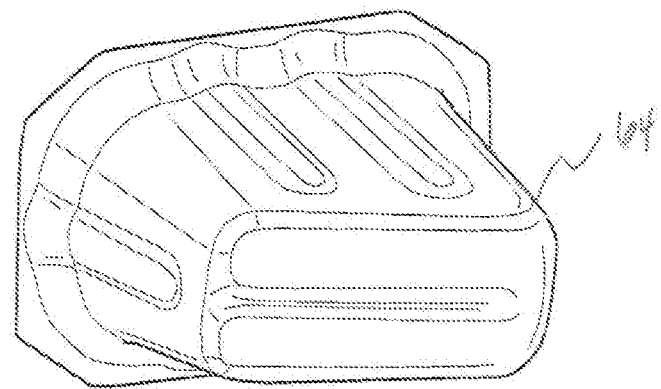
FIG. 13 is a perspective view of one embodiment of a crush can.
Figure 14:
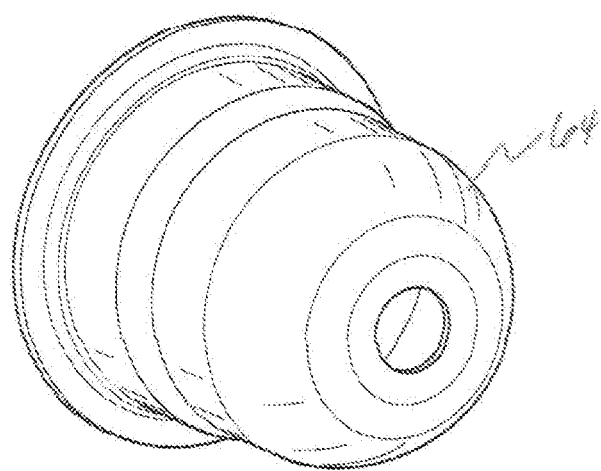
FIG. 14 is a perspective view of an alternative embodiment of a crush can.
Figure 15:
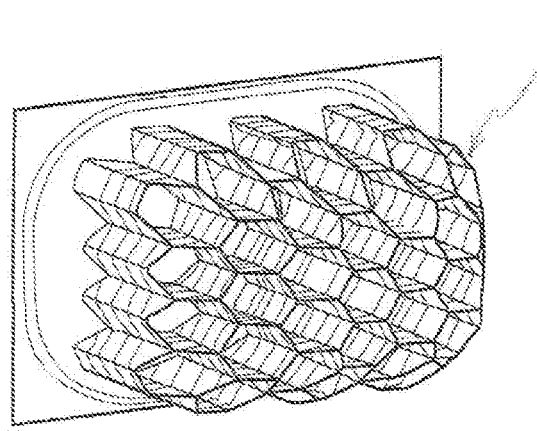
FIGS. 15A and 15B are perspective views of another alternative embodiment of a crush can.
Figure 15:
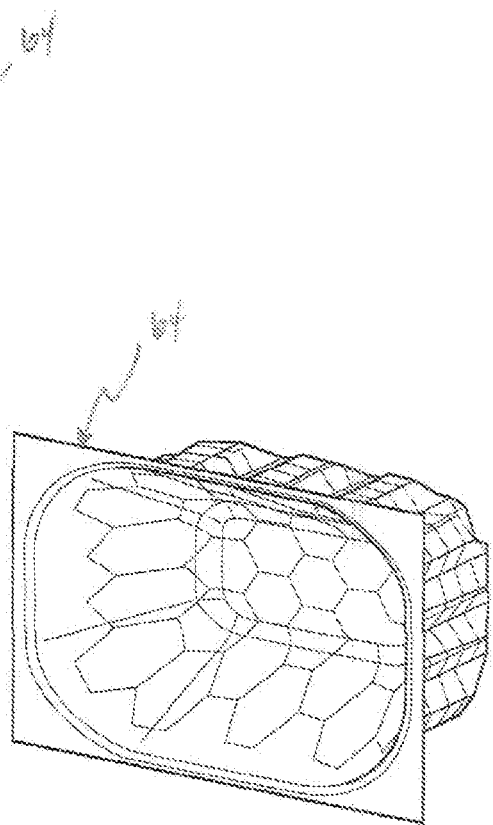
Figure 16:
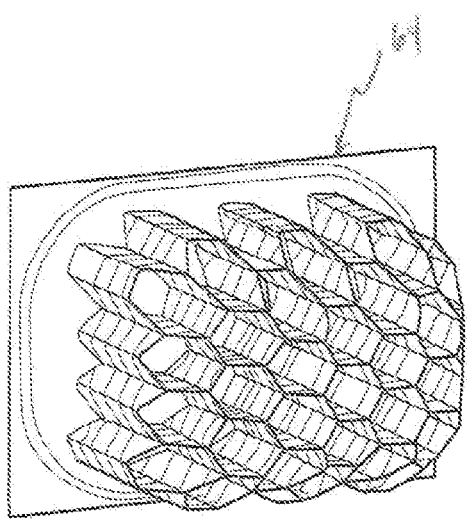
FIGS. 16A and 16B are perspective view of yet another alternative embodiment of a crush can.
Figure 16:
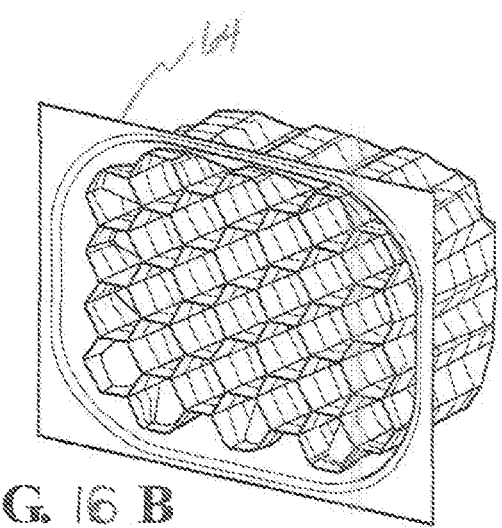

Finally, referring to FIGS. 13-16, various alternative embodiments of the crush can 64 are shown. FIG. 13 illustrates the integrally formed crush can 64 of the preferred embodiment. FIG. 14 illustrates a cylindrical shaped metal crush can 64'. And FIGS. 15A, 15B and 16A, 16B illustrate a generally cylindrical, concave and honeycomb construction reinforced crush can 64" for increased stiffness and energy absorption.

It should be appreciated that the tie bar assembly 30 may be formed of various materials or combination of materials without varying from the scope of the invention. For example, the reinforcement bars 32, 34 may be formed of high strength steel or aluminum. Alternatively, the bars 32, 34 may be formed of a raw fiber such as glass, carbon, Kevlar or basalt where the format of the fibers could be unidirectional, chopped, woven or a combination. The bars 32, 34 may also be a pre-impregnated composite, either thermoplastic or thermoset, using a raw fiber that could be co-molded or bonded to the shell 44 by injection molding, compression molding or injection-compression molding. Similarly, the tie bar shell 44 may be made from plastic or composite resin by injection molding, compression molding, injection-compression molding, thermoforming or pultruded. The resin may include thermoplastic olefin (TPO), polypropylene (PP), polyamide (PA or nylon), polyethylene terephthalate (PET), polybutylene terephthalate (PBT) or a mixture of PET/PBT, or polyphythalamide (PPA). Additionally, a thermoplastic composite or thermoset resin may be used for connecting and securing the reinforcement bars 32, 34 to the tie bar shell 44. For example, a thermoplastic composite resin may include polypropylene (PP), polyamide (PA or nylon), polyethylene terephthalate (PET), polybutylene terephthalate (PBT) or a mixture of PET/PBT, or polyphythalamide (PPA). The filler may be long or short glass, carbon fiber, Kevlar, basalt or combination thereof. The thermoset resin may include polyester, vinyl ester, epoxy, or urethane with fillers of glass fiber, carbon fiber, Kevlar, basalt or a combination thereof. The fibers may be unidirectional, chopped, woven or a combination thereof.

Finally, the crush can 64 may be steel, aluminum or unfilled plastic, thermoplastic composite resin or thermoset resin. The crush can 64 may be molded integral with the shell 44, bonded to the shell, mechanically joined by fasteners, ultrasonic welding, vibration welding or IR heating without varying from the scope of the invention. Additionally, the crush can 64 may be injected with material such as foam, rubber, plastic or composite, to improve the crush and energy absorption characteristics.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A tie bar assembly for distributing loads to a support frame of an automotive vehicle, said tie bar assembly comprising:
   a pair of spaced apart reinforcement bars extending longitudinally between opposing ends; and
   a tie bar shell supported by said reinforcement bars and extending between opposite first and second distal ends, said tie bar shell having a first support plate extending between said reinforcement bars adjacent said first distal end and a second support plate extending between said reinforcement bars adjacent said second distal end, wherein each of said support plates includes a base portion extending laterally between said reinforcement bars and a plurality of intersecting structural ribs projecting outwardly from said base portion of each of said support plates and formed integral therewith forming a grid pattern extending between said reinforcement bars for distributing loads from said reinforcement bars to the support frame of the vehicle.

2. The tie bar assembly as set forth in claim 1 wherein the tie bar shell includes an upper frame rail fixedly secured to one of said reinforcement bars and a lower frame fixedly secured to the other one of said reinforcement bars.

3. The tie bar assembly as set forth in claim 2 wherein the first support plate extends between said upper and lower frame rail adjacent said first distal end and said second support plate extends between said upper and lower frame rail adjacent said second distal end defining an opening therebetween.

4. The tie bar assembly as set forth in claim 3 further including a collapsible crush can fixedly secured to each of said first and second support plates for absorbing energy from an impact force on said tie bar assembly.

5. The tie bar assembly as set forth in claim 1 wherein said reinforcement bars are formed of metal and said tie bar shell is formed of plastic and overmolded to said reinforcement bars.

6. The tie bar assembly as set forth in claim 1 wherein said reinforcement bars are formed of metal and said tie bar shell is formed of composite material overmolded to said reinforcement bars.

7. The tie bar assembly as set forth in claim 4 wherein said crush can is formed integral with said first and second support plate, projecting outwardly from said base portion thereof and forming a hollow cavity therebetween.

8. The tie bar assembly as set forth in claim 7 wherein said crush can is formed of metal, plastic or composite material.

9. The tie bar assembly as set forth in claim 8 wherein said crush can is filled with energy absorption material.

10. The tie bar assembly as set forth in claim 9 wherein said crush can is formed with a honeycomb construction.

11. The tie bar assembly as set forth in claim 5 or 6 wherein said reinforcement bars include at least one overflow hole for receiving overmolded material of said tie bar shell therethrough to secure said tie bar shell to said reinforcement bar.

12. The tie bar assembly as set forth in claim 1 wherein said first and second support plates include longitudinally extending channels and said reinforcement bars are received in said channels for securing said support plates to said reinforcement bars.

* * * * *